US007018707B2

(12) United States Patent
Mase et al.

(10) Patent No.: US 7,018,707 B2
(45) Date of Patent: Mar. 28, 2006

(54) POROUS CERAMIC LAMINATE AND PRODUCTION THEREOF

(75) Inventors: Shigekazu Mase, Aichi (JP); Shigeo Nagaya, Aichi (JP); Junichiro Tsubaki, Aichi (JP); Kiyoshi Komura, Aichi (JP)

(73) Assignees: Noritake Co., Limited, Nagoya (JP); Chubu Electric Power Co., Inc., Nagoya (JP)

( * ) Notice: Subject to any disclaimer, the term of this patent is extended or adjusted under 35 U.S.C. 154(b) by 0 days.

(21) Appl. No.: 09/797,004

(22) Filed: Mar. 2, 2001

(65) Prior Publication Data

US 2002/0014298 A1 Feb. 7, 2002

(30) Foreign Application Priority Data

Mar. 3, 2000 (JP) ............................ 2000-058844

(51) Int. Cl.

| | |
|---|---|
| ***B32B 3/26*** | (2006.01) |
| ***B32B 3/00*** | (2006.01) |
| ***B32B 7/12*** | (2006.01) |
| ***B01D 29/00*** | (2006.01) |
| ***B01D 39/00*** | (2006.01) |

(52) U.S. Cl. ............................ 428/304.4; 428/306.6; 428/307.3; 428/312.2; 428/312.6; 428/314.8; 428/315.5; 428/315.7; 428/319.9; 428/317.3; 210/490; 210/500.25

(58) Field of Classification Search ............ 428/304.4, 428/306.6, 307.3, 312.2, 312.6, 314.8, 315.5, 428/315.7, 315.9, 317.3

See application file for complete search history.

(56) References Cited

U.S. PATENT DOCUMENTS

| | | | | |
|---|---|---|---|---|
| 4,929,406 A | * | 5/1990 | Abe et al. | 264/45.5 |
| 5,250,184 A | * | 10/1993 | Maier | 210/653 |
| 5,643,987 A | * | 7/1997 | Dismukes et al. | 524/442 |

FOREIGN PATENT DOCUMENTS

| | | |
|---|---|---|
| DE | 198 57 591 A1 | 6/2000 |
| EP | 0 515 936 B1 | 12/1992 |
| EP | 0 838 257 A2 | 4/1998 |
| GB | 2 277 885 A | 11/1994 |
| JP | 02175657 A | 7/1990 |
| JP | 02175658 A | 7/1990 |
| JP | 04104973 A | 4/1992 |
| JP | 07-109116 | 4/1995 |
| JP | 08-059364 | 3/1996 |
| JP | 08-104580 | 4/1996 |
| JP | 08-165177 | 6/1996 |
| JP | 10-085568 | 4/1998 |

(Continued)

OTHER PUBLICATIONS

J. Koresh et al.; "Study of Molecular Sieve Carbons"; J.C.S. Faraday I, 1980, 76, 2457-2471.

(Continued)

*Primary Examiner*—Terrel Morris
*Assistant Examiner*—Victor S. Chang
(74) *Attorney, Agent, or Firm*—Armstrong, Kratz, Quintos, Hanson & Brooks, LLP

(57) ABSTRACT

A porous ceramic laminate has a porous silicon nitride substrate and a porous silicon nitride separation film supported thereon and having minute pores of sizes capable of Knudsen separation or molecular sieve by sintering a porous silicon nitride substrate supporting a formed layer containing polysilazane at 800° C. in a nitrogen atmosphere.

39 Claims, 7 Drawing Sheets

A:CONVENTIONAL INORGANIC FILM
B:CONVENTIONAL RESULTS
C:ORGANIC FILM

FOREIGN PATENT DOCUMENTS

| | | |
|---|---|---|
| JP | 10-165791 | 6/1998 |
| JP | 10-218690 | 8/1998 |
| JP | 11-057432 | 3/1999 |
| JP | 11-057433 | 3/1999 |
| JP | 11-114388 | 4/1999 |

OTHER PUBLICATIONS

G. R. Gavalas et al.; "Deposition of $H_2$-Permselective $SiO_2$ Films"; Chemical Engineering Science, vol. 44, No. 9, 1829-1835; 1989.

C. J. Brinker et al.; "The Physics and Chemistry of Sol-Gel Processing"; Sol-Gel Science; Chapter 11: Sintering; pp. 695-719.

D. H. Everett et al.; "Adsorption in Slit-Like and Cylindrical Micropores in the Henry's Law Region"; Adsorption in Micropores; pp. 619-637.

Japanese Office Action dated Jun. 14, 2005, and English translation.

* cited by examiner

*1kgf/cm² =9.8×10 Pa

SURFACE

CROSS SECTION

SUBSTRATE

SURFACE

CROSS SECTION

3 TIMES LAMINATION SEPARATION FILM

SURFACE

CROSS SECTION

5 TIMES LAMINATION SEPARATION FILM

7 TIMES LAMINATION CROSS SECTION SEPARATION FILM

A:CONVENTIONAL INORGANIC FILM
B:CONVENTIONAL RESULTS
C:ORGANIC FILM

POROUS CERAMIC LAMINATE AND PRODUCTION THEREOF

FIELD OF THE INVENTION

This invention relates to a porous ceramic laminate and the production of the same. More in detail, the present invention pertains to a porous ceramic laminate suitable for filters, in particular, to filters for separating and refining one or more of various gases and vapors very effectively such as micro-filtration filter, ultra-filtration filter, gas separation filter and the like.

BACKGROUND OF THE INVENTION

Porous materials are utilized in the fields of foods, medical supplies, biotechnologies and the like, for instance, in the step of separating, filtrating, or condensing various gases, vapors and organic solvents. Recently, environmental issues become more serious on a global scale, and porous materials are also applied to purification devices of various environmental pollution gases.

In the separation of various gases and vapors, membrane separation is under examination for separating and refining condensed special gas component from multi-component gas mixture. An organic polymer film applied in the process of membrane separation is inappropriate for use under high temperature conditions on account that heat resistance is low. Further, the organic polymer film is easy to be corroded by fluid used, thereby it causes problems that lifetime and efficiency become lowered. In contrast, an inorganic membrane applied in the process of membrane separation is excellent in durability, heat resistance and thermal shock resistance. Accordingly, it is in the hope of being put into practice under the conditions that the organic polymer membrane is inapplicable, and its development is now underway.

In case of applying various kind of zeolite, sol-gel, CVD or other films having innumerable minuscule pores for gas separation, some degree of mechanical and thermal strengths are required, but efficiency is reduced an the thickness becomes large. Accordingly, as for a porous ceramic filter, asymmetric film structure and techniques for changing a functional film into thin and defectless one without deteriorating its function are necessary in order to restrain the deterioration of penetration efficiency and impart the strength to the thin membrane portion. In addition, there are many problems to be solved in a process for preparing a film of practically usable structure in terms of pressure resistance, reliability and sealing for use under severe conditions for example, at high temperatures.

Various studies have been made with regard to porous ceramic materials or in regard of processes for forming a ceramic membrane on a substrate, and various porous ceramic filters suitable for the above use are proposed. For example, JP-A-7-109116/1995 (The term "JP-A" used herein means "unexamined published Japanese patent application") discloses a process for forming a fine crystalline zeolite film inside the pores and on the surface of an alumina substrate applying hydrothermal synthesis; JP-A-4-104973/1992 discloses a process for preparing porous ceramic materials using inorganic particles of a predetermined diameter range and a binder: JPA-2-175657 and JPA-2-175658/1990 disclose a process for preparing a ceramic composition comprising the step of sintering silicon nitride powder and polysilazane; and JP-A-8-059364/1996 discloses a process for preparing porous ceramic materials of a uniform pore size distribution by the use of ceramic powder and ceramic precursor.

SUMMARY OF THE DISCLOSURE

Conventional processes disclosed in the above publications have the following drawbacks. In case of using aggregates as disclosed in JP-A-4-104973, pore sizes of ceramics obtained depend on aggregate particle diameters. Formation with aggregates of particle diameters about 3 times larger than the pore size is necessary in preparing porous materials. However, as concerns microspores, it is very difficult to prepare homogeneously formed products using fine aggregate particles, and it is further difficult to form thin films by the use of ceramics having micropores.

In the process disclosed in JPA 2-175657 for preparing a ceramic composition, sintering aids for silicon nitride such as alumina and yttria are used together. Ceramic compositions obtained are dense and compact materials, and the process is not for preparing a porous ceramic.

According to preparing conditions disclosed in JPA-2-175658, high strength ceramic compositions are obtained by calcinating formed material containing silicon carbide powder and ceramic precursor (ceramic precursor capable of being changed into silicon nitride or silicon carbide by heat). However, "Example" disclosed in this reference shows that these compositions are porous material having bulky pores or compact material of low porosity. Accordingly, it is difficult to obtain a substrate having a porous ceramic membrane, which is supported thereon and through which pores necessary for filters are made, even if these processes are applied.

According to the preparing conditions disclosed in JP-A-8-059364, it is possible to obtain porous ceramic material whose pores are fine as well as which have a uniform pore size distribution as compared with those prepared by the above described conventional processes through the steps of forming by the use of ceramic powder together with ceramic precursors, and thereafter, calcinating at final calcination temperatures ranging from 1,350 to 1,600° C. However, ceramic precursors undergo final calcination together with ceramic powder at comparatively high temperatures so that sizes of pores obtained are not in the range of micropores through which gas separation can be made. Still more in this publication, there is a description telling the fact that pores were scarcely found and porous materials couldn't be obtained even when production was made adjusting the final calcination temperature to 800° C. (See page 6, paragraph [0026]).

JP-A-7 109116 discloses a process for forming a dense crystalline zeolite film inside the pores and on the surface of an alumina substrate applying hydrothermal synthesis. However, according to conventional techniques including the processes disclosed in the above, material of a substrate portion is different from that of a membrane portion in almost all of their lamination so that reliability as regarding heat resistance and thermal shock resistance, which are important factors for use at high temperatures, is low. In order to impart ideal properties suitable for use as a separation film at high temperatures to a ceramic membrane, it is important to develop practically applicable porous ceramic membranes and substrates in consideration of materials for preparing substrates and separation membranes (also containing an interlayer) in addition to subsequent sealing and modulation.

On the other hand, as for asymmetric membranes prepared through the step of forming a separation membrane on the surface of a substrate, when sizes of crystal grains contained in the porous substrate portion are large, the separation membrane is formed in the comparatively large pores of the substrate. It is difficult to remove completely defects resulting from enlarging the area of the film merely by forming a membrane in the pores of the substrates so that it is necessary to thicken the film thickness of the separation membrane portion to some extent for attaining defect-free and imparting strength. However, this makes permeability decreased. Also as for sol-gel films, when sizes of crystal grains contained in a porous substrate portion are large, penetration of sols into the substrate takes place easily so that gelation and film forming become difficult to cause such problems that complete removal of defects resulting from enlarging the area of the film becomes difficult furthermore.

Accordingly it is an object of the present invention to provide a porous ceramic laminate that gives a solution to at least one of the above problems unsolved in the prior art. Another object of the present invention is to provide a process for preparing a porous ceramic laminate that gives a solution to at least one of the above prior art problems.

According to a first aspect of the present invention, there is provided a porous ceramic laminate comprising a porous ceramic separation film and a porous ceramic substrate supporting the separation membrane, wherein each of the separation membrane and the substrate contains non-oxide ceramics as a main component, and the separation membrane has nano-pores essentially of sizes small enough to realize Knudsen separation.

The substrate may support the separation membrane through the intermediary of at least one porous ceramic interlayer. To both of the separation membrane and the substrate, their main component may be common. In case of preparing the interlayer, the main component of the interlayer may be common with that of the substrate. In these cases, structures excellent in thermal shock resistance can be imparted. The separation membrane and an oxide or amorphous layer existing close to the uppermost surface of the laminate may principally have nano-pores of sizes small enough to realize Knudsen separation. The porous ceramic laminate of the present invention can be used as a part or entirely of a porous ceramic filter.

In a second aspect of the present invention, there is provided a process for preparing a porous ceramic laminate comprising a porous ceramic separation membrane producing step which comprises:

providing a porous ceramic substrate which supports a formed layer containing a ceramic precursor that produces non-oxide ceramics by firing, the substrate containing non-oxide ceramic as a main component, followed by calcinating the resultant substrate, wherein in the separation film producing step, the calcination is carried out at temperatures capable of forming a porous ceramic membrane having micropores essentially of sizes which are small enough to realize Knudsen separation.

In the process of the present invention, the formed layer may be supported on the substrate through the intermediary of at least one porous ceramic interlayer. A ceramic precursor capable of producing the main component of the substrate by firing (or calcination) is used as the precursor. In case where the substrate has the interlayer formed thereon, the main component of the interlayer may be the same with that of the substrate. In these cases, a porous ceramic laminate excellent in thermal impact (thermal shock) resistance can be prepared. The formed layer can be prepared by dipping. In this case, a porous ceramic laminate having a defect-free porous ceramic separation membrane having a large area can be prepared. The formed layer may be formed and dried in an inert atmosphere.

In a third aspect of the present invention, there is provided a porous ceramic laminate comprising a porous ceramic separation membrane and a porous ceramic substrate supporting the separation film, the separation membrane and the substrate each containing non-oxide ceramics as a main component, and the separation membrane having micropores essentially of sizes small enough to realize molecular sieve separation. The substrate may support the separation membrane through an intermediary of at least one porous ceramic interlayer.

The separation membrane comprises one or more laminated layers, preferably of 3 to several laminated layers. The laminate is substantially defect-free.

In a forth aspect, the process for preparing the porous ceramic laminate is adapted for producing nano-pores essentially of sizes which are small enough to realize molecular sieve separation, generally of the angstrom order (an order of sub-nanometer) e.g., about 5 angstroms.

PREFERRED EMBODIMENTS OF THE INVENTION

<Porous Ceramic Laminate>

Figure 1:
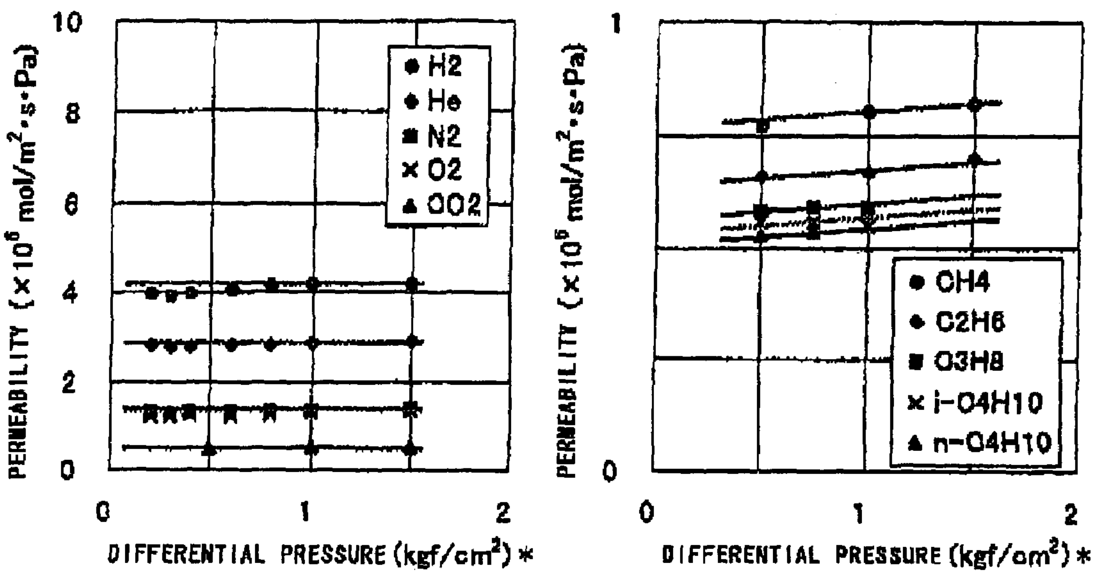
FIG. 1 is a graph showing the relation of differential pressure and permeability (dependency of permeability on differential pressure).

Each of the porous ceramic separation membrane and the porous ceramic substrate contains non-oxide ceramics (preferably one or both of silicon nitride and silicon carbide) as a main component (preferably 60% or more, more preferably 70% or more, still more preferably 80% or more, and most preferably 90% or more by weight of component). The porous ceramic substrate may further contain polymeric, metallic or other material.

The porous ceramic membrane has essentially (at least 70%, preferably 80% or more, more preferably 90% or more, further more preferably 95% or more of the total pores) nano-pores of sizes capable of realizing Knudsen separation (the pore size is less than 50 nm, preferably from 2 to 5 nm). Under the condition that the pore size is 10 nm or less, gas molecules collide dominantly with the walls of pores rather than colliding with each other so that separation (condensation) is made possible based on the difference of gas molecular permeation velocity. This separation is called "Knudsen separation".

In the region of the porous membrane having pore sizes of not more than 10 nm, the relation is valid that the mean free path (mutual collision interval distance necessary for collision) of gas molecules is considerably larger than sizes (diameters) of pores that the porous membrane has. In this case, gas molecules frequently collide with the inner wall of the pores rather than colliding with each other. If pressure difference is given between the front side and the back side of the porous membrane, large molecular weight gas molecules (e.g., $N_2$) lose momentum by collision largely as compared with small molecular weight gas molecules (e.g., $H_2$). As a result, the gas molecular permeation rate (velocity) in the pores of the porous membrane is $H_2>N_2$. The Knudsen region is generally in the region of not more than 10 nm. In this case, the ratio of $H_2/N_2$ gas molecule permeation rates is theoretically equal to the positive square root of $H_2$ permeation rate/$N_2$ permeation rate—(molecular weight of $H_2$/molecular weight of $N_2$) . This value corresponds to the positive square root of 28/2, and is about 3.7.

The interlayer may contain non-oxide ceramics (preferably one or both of silicon nitride and silicon carbide) as a main component (preferably 60% or more, more preferably 70% or more, still more preferably 80% or more, and most preferably 90% or more by weight of component).

The porous ceramic separation membrane as well as the porous ceramic substrate may have the same main component (preferably 60% or more, more preferably 70% or more, still more preferably 80% or more, and most preferably 90% or more by weight of component). Further, in case where the porous ceramic laminate of the present invention has an interlayer, the interlayer as well as the above substrate may have the same main component (preferably 60% or more, more preferably 70% or more, still more preferably 80% or more, and most preferably 90% or more by weight of component).

The thickness of the porous ceramic separation membrane may be preferably 20 μm or less, more preferably 5 μm or less, still more preferably 3 μm or less. Both of the porous ceramic separation membrane and the porous ceramic interlayer may be amorphous or crystalline, or a mixture thereof or of certain intermediate state.

The porous ceramic substrate may be made of inorganic particles having a mean diameter of about 0.05 μm to 50 μm and preferably having narrow pore size distribution. Preferable porosity of the porous ceramic substrate ranges from 20 to 80%. The three point bending strength of the porous ceramic substrate is preferably 30 Mpa or more, more preferably 60 Mpa or more, and further more preferably 90 Mpa. Preferable shape of the porous ceramic substrate may be tube-shaped, monolith-shaped, honeycomb-shaped, 3-or-more-side-having-polygonal flat plate-shaped or stereo-shaped.

The porous ceramic laminate of the present invention is excellent in gas penetration efficiency, membrane-forming property and reproducibility, capable of Knudsen separation of inorganic gas permeating at ordinary temperatures, and capable of exhibiting various absorbing behaviors by virtue of various surface modifications in the steps of post-treatment. In the porous ceramic laminate of the present invention, the porous ceramic substrates may have various shapes. On the surface or inside the pores of such substrates, or on the surface or inside the pores of the interlayer, the porous ceramic separation film having extremely minute pores can be formed.

<Process for the Preparation of a Porous Ceramic Laminate>

In the step of producing a porous ceramic separation film according to the present invention, a formed layer containing a ceramic precursor capable of producing non-oxide ceramics by firing (or calcination) is changed into a porous ceramic separation membrane by calcination. The ceramic precursor, put into the formed layer in the step of forming a porous ceramic separation membrane, produces non-oxide ceramics (preferably one or both of silicon nitride and silicon carbide) by calcination, and preferably comprises one or more of polysilazanes and polycarbosilanes.

On the other hand, the ceramic substrate contains non-oxide ceramics as a main component (preferably 60% or more, more preferably 70% or more, still more preferably 80% or more, and most preferably 90% or more by weight of component).

In the step of producing a porous ceramic separation membrane according to the present invention, firing (calcination) is done at temperatures (at least 1,200° C. or less, preferably 1,100° C. or less, more preferably 1,100° C. or less, still more preferably from 250 to 900° C., most preferably from 700 to 900° C.) capable of forming a porous ceramic membrane having micropores essentially (at least 70%, preferably 80% or more, more preferably 90% or more, further more preferably 95% or more of the total pores) of sizes capable of realizing Knudsen separation.

In the step of producing a porous ceramic separation membrane according to the present invention, homogeneous, dense porous thin membrane can be prepared by forming a formed layer, which is changed into a separation membrane after calcination, by the use of the aforementioned ceramic precursor as a raw material followed by calcinating the formed layer at temperatures capable of converting the ceramic precursor into an amorphous and/or crystalline state.

The porous ceramic separation membrane can be preferably formed through the step of coating a raw solution containing at least organic and/or inorganic ceramic precursor and solvent on the porous ceramic substrate or on the porous ceramic interlayer, and the step of thermally decomposing the aforementioned ceramic precursor principally in an inert atmosphere upon sintering or firing (calcination).

Preferable polysilazanes are those prepared by the process including the steps of reacting dihalosilane ($R^1SiHX_3$) or a mixture of same and other dihalosilane ($R^2R^3SiHX_3$) with ammonia to prepare silazane oligomers, dehydrogenating any of the oligomers in the presence of basic catalyst to remove the hydrogen atom from nitrogen atoms locating adjacent (bonded) to the silicon atom, and to polymerize by dehydrogenation-crosslinking. Also, organic or inorganic polysilazanes polymerized by other processes may be used. Here $R^1$, $R^2$, and $R^3$ may be selected from the group consisting of those of C1 to C6: lower alkyl, substituted allyl, unsubstututed allyl, and those of C6–C10: unsubstututed aryl, trialkylamino, dialkylamino. Further, $R^1$ may be hydrogen atom. $R^1$, $R^2$, and $R^3$ may be different from or the same with each other, X is halogen atom.

A process for preparing a porous ceramic laminate of the present invention may have a substrate-forming step for forming a porous ceramic substrate and an interlayer-forming step for forming one or more porous ceramic interlayers on the porous ceramic substrate prepared in the substrate-forming step prior to the step of forming a porous ceramic separation membrane. The porous ceramic interlayer may be formed using the same precursor with that used in the step of forming a porous ceramic separation membrane.

In the interlayer-forming step, an interlayer is preferably formed through the steps of: admixing the aforementioned precursor with non-oxide ceramic powder material in such an amount that the ceramic precursor can be almost filled inbetween the grain boundaries in the course of formation; forming (shaping) to obtain a formed (shaped) material; and calcinating the formed material thus obtained at temperature which is in the range not to produce greatly the grain growth of the non-oxide ceramic powder and at the same time which is not less than the crystallizing temperature of the ceramic precursor.

The calcination temperature in forming a porous ceramic separation membrane by calcination is not more than the calcination temperature in forming a porous ceramic substrate by calcination (preferably 1,100° C. or less, more preferably 1,000° C. or less, still more preferably from 250 to 900° C.). On the other hand, in case of forming a porous ceramic interlayer by calcination, the calcination temperature is not more than that applied in producing the substrate (preferably 1,800° C. or less, more preferably 1,600° C. or less, still more preferably 1,400° C. or less), and not less than that applied in forming the separation membrane (preferably 250° C. or more, more preferably 700° C. or more).

More details of the porous ceramic laminate and the production thereof according to the present invention will be explained as follows.

In order to realize highly effective processes by applying actual processes for separating and refining gases and vapors, it is necessary to control the pore size distribution in a substrate so as not to produce a large pressure energy loss resulting from penetration of fluid. However, in case of forming various separation membranes thinly on a substrate or inside of pores applying various membrane-forming processes, the fact that the pores distributed in the substrate are small is favorable for imparting strength to, for example, a zeolite thin membrane of comparatively low strength. However, this entrains difficulty in preventing completely the layer from generation of defects at enlarged areas, in case where too large micro-pores exist in the substrate, due to crystallization caused in the pores of the substrate.

In order to realize defects-free and to impart strength, it is necessary to form a separation membrane thickly, but this causes generation of pressure energy loss and decrease in filtration efficiency. In case of applying sol-gel techniques, if too large pores exist in the substrate, gelation or membrane forming becomes difficult because sol penetrates even into the interior of the substrate. On this account, it is necessary to repeat the step of forming a separation film via at least one interlayer to realize defects-free.

According to the present invention, in order to create a separation membrane excellent in penetration and thermal shock resistance, the main material of the substrate portion is adjusted to (or made compatible with) that of the separation membrane portion by forming controlled, sintered silicon nitride film inside the micropores existed on the surface of silicon nitride applying the thermal decomposition of an organic silicon compound called "polysilazane" in an inert atmosphere.

In particular, according to the dipping process, in the step of forming a separation membrane, a raw solution exhibits low (poor) wettability so that it is possible to restrain the penetration of the raw solution into the porous substrate in the course of membrane forming, and further to restrain smoothly the destruction of fine structures owing to the adverse effects of gas generation, capillary pressure, shrinkage appearing in the course of calcination resulting from the thermal decomposition of the ceramic precursor in an inert atmosphere.

Then, in case of membrane-forming a separation membrane portion on the surface of a porous substrate or of an interlayer each of which has a narrow pore size distribution, generation of defects in the separation membrane can be reduced greatly because strict conditions are not necessary to be set up. Thereby, a thin defect-free membrane with micro-upto nano-pores can be obtained even without an interlayer.

As a result of examining the structural effect of the substrate and separation membrane on separation efficiency by gas permeate tests at ordinary temperatures, porous separation membranes, which have nano-pores of a grade capable of realizing Knudsen separation, in which generation of defects is restrained, the films being thin, homogeneous and dense, were obtained by coating a ceramic precursor directly on the surface of a porous silicon nitride substrate to form the separation membrane portion, thereafter calcinating finally at low temperatures on the order of about 800° C.

Summing up, the porous ceramic laminate of the present invention possesses a structure difficult to cause thermal separation because the substrate and separation membrane portion, or further the interlayer, have the same main material, appropriate for separation and refining processes performed at high temperatures in which heat resistance as well as thermal shock resistance are required, easy to enlarge the area of the laminate and at the same time stable in a synthesizing process employed in the step of preparation of the laminate, and expected to have ideal properties, necessary for a separation membrane practically usable at high temperatures, such as Knudsen separation and excellent penetration efficiency at ordinary temperatures. By analogy with this, the present invention is applicable to substrates and membranes each made of different materials from those referred to in the following paragraph of "Example" merely by alteration of mutual materials.

In the present invention disclosed herein, strength at elevated temperature, pore size distribution and porosity are expressly assumed as main factors of a substrate which exert effect on various processes, and the present invention pertains to the improved constitutions of separation layer and substrate with respect to materials used in the conventional porous ceramic filters and to the process for preparing a separation membrane or an interlayer. Other processes may be the same with conventional ones.

EXAMPLES

Example 1

<Preparation of Porous Silicon Nitride Substrate>

To 90 parts by weight of silicon nitride powder (trade name: SN-E10, produced by Ube Industries, Ltd.), 5 parts by weight of alumina powder (trade name: AKP-10, produced by Sumitomo Chemical Co., Ltd.) and 5 parts by weight of yttria powder (trade name: Y-F, produced by Mitsubishi Chemical Corp.), 80 parts by weight of water were added. The resultant slurry was mixed in an alumina pot (using 30 mm ϕ ball) for 24 hours. To this slurry 10 parts by weight of wax organic binder and 4 parts by weight of wax emulsion were added and mixed for 16 hours followed by spray-drying to prepare granules.

Next, the granules were compactly filled in a rubber mold as the mold wan vibrated. The granule-filled mold was processed greenly into tube shape (outside diameter: 11.5 mm, inside diameter; 9.0 mm, length: 40 to 480 mm) by CIP (cold isostatic pressing, hereinafter abbreviated as "CIP") to be changed into a green tube processed for preparing a substrate. The thus obtained green tube was sintered after degreasing to obtain a tube-shaped porous silicon nitride substrate.

Principal properties of the porous silicon nitride substrate thus obtained are shown in Table 1. In Table 1, pore size (mean pore diameter) and porosity of the porous silicon nitride substrate are measured values by a method of mercury penetration. The porous silicon nitride finally sintered at 1,450° C. had a porosity of about 40%, and the three point bending strength at elevated temperature of 800° C. on the biscuit face corresponding to the membrane-forming face was not less than about 70 Mpa. It was ascertained thereby that the porous silicon nitride is fully applicable to a substrate for preparing a heat-resistive separation membrane.

On the other hand, the porous silicon nitride finally sintered at 1,400° C. had a porosity of about 50%, and a three point bending strength of about 70 Mpa at elevated temperature of 800° C. It was also ascertained thereby that the porous silicon nitride is fully applicable to a substrate for preparing a heat-resistant separation membrane. However, in this case, the width of the pore size distribution was very narrow, and the texture consists of a α-$Si_3N_4$, and is stable. Thus prepared substrate obtained through the step of sintering at relatively low temperatures does not require membrane-forming step of an interlayer, and accordingly, a separation membrane can be directly formed on the substrate. In the following course of membrane forming, substrate tubes obtained at 1400° C. were applied.

TABLE 1

| Final sintering temperature | 1,400° C. | 1,450° C. | 1,500° C. |
|---|---|---|---|
| Mechanical | | | |
| Porosity (%) | 47.1 | 40.7 | 22.6 |
| Pore size (μm) | 0.16 | 0.17 | 0.16 |
| Bulk density (g/cm3) | 1.77 | 1.94 | 2.40 |
| Three point bending strength at room temperature: On biscuit face (Mpa) | 60–67 | 95–128 | 136–171 |
| Three point bending strength at high temperature: On biscuit face (Mpa) | 60–70 | 102–114 | 120–151 |
| Three point bending strength at room temperature: On processed face (Mpa) | 58–71 | 95–115 | 143–159 |
| Three point bending strength at high temperature: On processed face (Mpa) | 61–66 | 105–125 | 119–122 |
| Green processability | Good | Good | — |
| Thermal | | | |
| Linear expansion coefficient: 25 · 800° C. (×10-6/K) | 3.4 | 3.2 | 3.3 |

TABLE 1-continued

| Final sintering temperature | 1,400° C. | 1,450° C. | 1,500° C. |
|---|---|---|---|
| Structure | | | |
| Crystal structure | α-Si3N4 | α-Si3N4 + β-Si3N4 (poor) | α-Si3N4 + β-Si3N4 (rich) |

<Film-formation of Interlayer>

The volume ratio of polysilazane powder (any of NCP-200 (trade name, produced by Chisso Corp.), N-N510 (trade name, produced by Tonen Corp.) and N-L710 (trade name, produced by Tonen Corp.)) to silicon nitride powder (trade name: SN-E10, produced by Ube Industries, Ltd.) was formulated to 160:100, and respective solvent amount was controlled so as to bring the solid content into line with values shown in the following Table 2 to prepare slurries.

As polysilazane material, 3 kinds of materials different in terms of material (organic or inorganic) and yield were examined. Respective preparing condition of slurries (formulation of immersing (dipping) solution for film-forming an interlayer) is shown in the following Table 2. Each kind of slurry was stirred ultrasonically.

TABLE 2

| No. | (a) | (b) | (c) | (d) | (e) | (f) |
|---|---|---|---|---|---|---|
| Kind of poly-silazane | NCP-201 | NCP-201 | N-N510 | N-N510 | N-L710 | N-L710 |
| Solid content (wt. %) | 5.3 | 2.6 | 5.3 | 2.6 | 5.3 | 2.6 |

The tube-shaped porous silicon nitride substrate prepared through the steps of CIP and sintering at 1,400° C., was immersed in the slurry stirred ultrasonically for about one hour to coat the slurry containing the polysilazane and silicon nitride powders on the outer surface of the substrate to form a thin layer. The thus coated substrate was dried at room temperature for 48 hours, thereafter sintered at 1,350° C. under normal pressure in a nitrogen atmosphere with a resistance-heating, vacuum/pressurized sintering furnace.

In order to examine the presence of defects and membrane-forming properties, EDX analysis (Energy Dispersive X-ray analysis) on the sectional area and coated membrene surface as well as pure gas permeate test etc. were carried out. The results of gas permeate flux of various gases, the existence of pinholes and cracks and elemental analysis based on EDX analysis practiced on the coated membrane surface (measuring time: 100 sec., accelerating voltage: 20 kV) are shown in the following Table 3.

TABLE 3

| No | I. S.[1] | Substrate (sintering temp., ° C.) | $N_2$ Applied pressure (kgf/cm$^2$) | $N_2$ Flux (mol/m$^2$s) | $C_3H_6$ Applied pressure (kgf/cm$^2$) | $C_3H_6$ Flux (mol/m$^2$s) | n-$C_4H_{10}$ Applied pressure (kgf/cm$^2$) | n-$C_4H_{10}$ Flux (mol/m$^2$s) | BP value | Numeral atomic density Si | N | C | O |
|---|---|---|---|---|---|---|---|---|---|---|---|---|---|
| 1 | (a) | 1,450 | 0.50 | 0.11 | 0.50 | 0.41 | 0.51 | 0.46 | 5.0~ | 23 | 26 | 38 | 14 |
| 2 | (b) | 1,450 | 0.50 | 0.10 | 0.50 | 0.30 | 0.51 | 0.42 | 5.0~ | — | — | — | — |
| 3 | (c) | 1,450 | 0.50 | 0.10 | 0.50 | 0.30 | 0.51 | 0.86 | 5.0~ | 29 | 29 | 33 | 9 |
| 4 | (d) | 1,400 | 0.50 | 0.12 | 0.50 | 0.37 | 0.51 | 0.50 | — | — | — | — | — |
| 5 | (e) | 1,400 | 0.50 | 0.13 | 0.50 | 0.40 | 0.51 | 0.55 | — | 25 | 28 | 38 | 10 |
| 6 | (f) | 1,400 | 0.50 | 0.12 | 0.50 | 0.35 | 0.51 | 0.51 | 5.0~ | 30 | 32 | 28 | 10 |

[1]"I. S." means an immersing solution for preparing an interlayer.

The interlayer obtained by the process of the present invention has a microstructure in which silicon nitride forms matrix, and polysilazane is filled in the void of the silicon nitride particles. It was ascertained by the observation of the surface and the sectional area with SEM (scanning electron microscope) that surface defects of sub-microns were not produced on the surface of the interlayer obtained.

However, in case where the solid content of slurry was low under respective conditions of membrane-forming of the interlayer, a dense layer, in which polysilazane is completely filled in the voids of silicon nitride, was observed only near the surface. Accordingly, it is presumed that defects will become easily produced at an enlarged membrane area in this case. This is based on a reason that penetration of a raw immersing solution into the substrate will occur excessively. It was ascertained that the interlayer produced by the process of the present invention is very excellent in adhesion to a porous silicon nitride substrate, and that no difference was observed in the gas permeation resulting from the difference in the membrane-forming conditions.

<Film Forming of Separation Membrane>

Solvent amount was controlled so as to adjust the solid content of polysilazane powder (any one of NCP-200 (trade name, produced by Chisso Corp.), N-N510 (trade name, produced by Tonen Corp.) and N-L710 (trade name, produced by Tonen Corp.) ) to 1, 5 or 10% by weight to prepare various coating solutions. Concerning raw polysilazanes, 3 kinds different in material (organic or inorganic) and yield were examined. The following Table-4 shows conditions of preparing various coating solutions for forming a separation layer (formulation of immersing solution for membrane-forming a separation layer). Each solution was stirred ultrasonically for about one hour.

TABLE 4

| No. | (a) | (b) | (c) | (d) | (e) | (f) | (g) | (h) | (i) |
|---|---|---|---|---|---|---|---|---|---|
| Kind of polysilazane | NCP-201 | NCP-201 | N-N510 | N-N510 | N-N510 | N-N510 | N-L710 | N-L710 | N-L710 |
| Solid content (wt. %) | 10 | 5 | 1 | 10 | 5 | 1 | 10 | 5 | 1 |

The tube-shaped porous silicon nitride substrate prepared through the steps of CIP and sintering at 1,400° C., or otherwise, an asymmetric tube prepared by forming the aforementioned interlayer on the substrate was immersed in the coating solution for forming a separation layer to coat the coating solution containing polysilazane, thereby to form a thin film only on the surface of the tube-shaped porous silicon nitride substrate or on the surface of the asymmetric tube having the interlayer. The thin-membrane-formed substrate or the asymmetric tube was dried at room temperature for 8 hours and thereafter calcined at 800° C. under normal pressure in a nitrogen atmosphere with a resistance-heating, vacuum/pressurized sintering furnace.

Evaluation of the existence of defects and separation performance was made by a gas permeation test using single kind of gas. Thereby studies were made on the possibility of controlling defects so as not to be produced and of materializing membrane properties satisfying the goal of the initial plan according to the present synthetic process. Results (gas permeation characteristic values) concerning separation layers prepared on various membrane-forming conditions are shown in the following Table 5. Thickness was determined by the observation with TEM (transmission electron microscope), and mean pore size on the separation layer portion was determined by a nitrogen gas absorption method.

become stable on the condition that the preparing conditions and atmospheres (in membrane-forming and drying) were controlled strictly to certain extent with regard to various process conditions of the range shown in the examples starting from the preparation of a substrate, membrane-forming an interlayer and coming to the end of membrane-forming a separation layer. In particular, it is expected that flexible membrane forming can be done as to a separation layer. This implies a very positive meaning for scaling up process. In case of actual scaling up, properties became deteriorated. However, these values contain the effect of measurement (condensation at downstream on the gas-permeated side). Taking these effects into consideration, it turned out that the scale up hardly causes deterioration of the properties.

Figure 2:
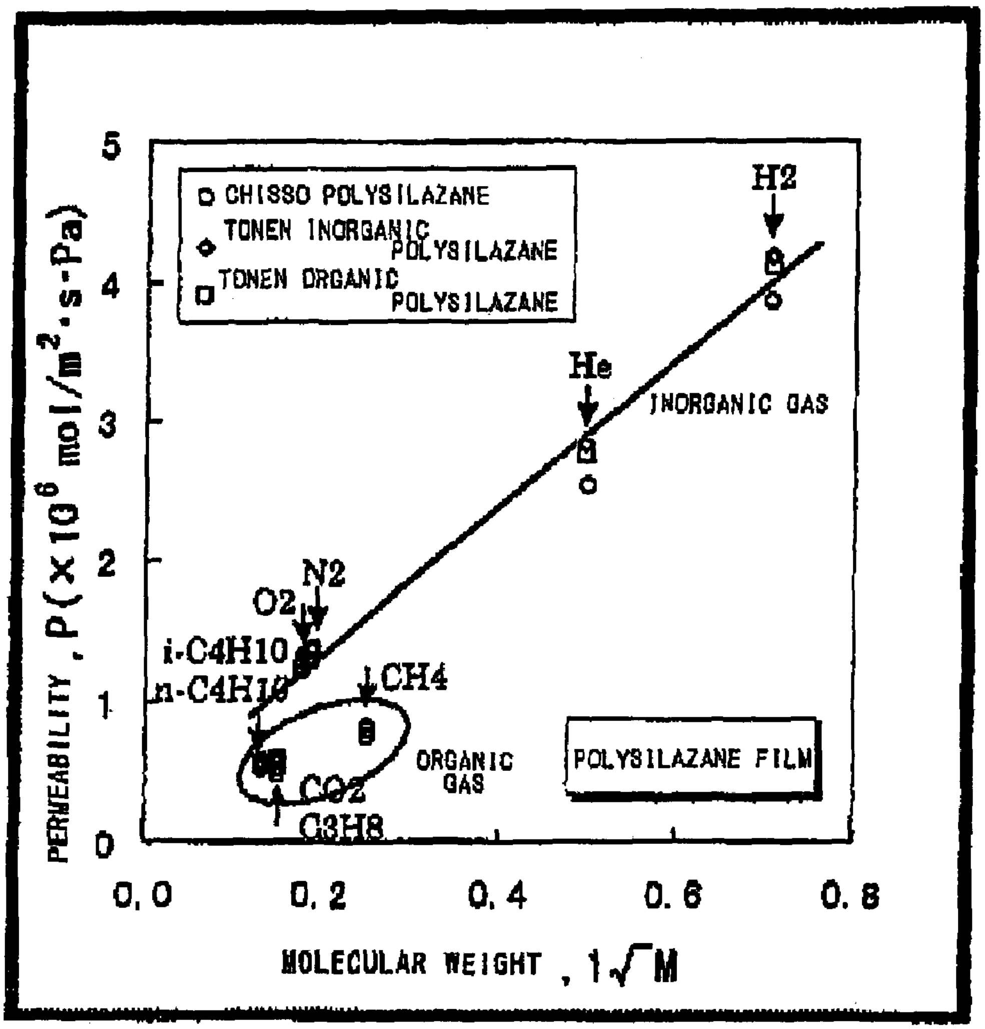
FIG. 2 is a graph showing the relation of molecular weight and permeability (dependency of permeability on differential pressure).
Figure 3:
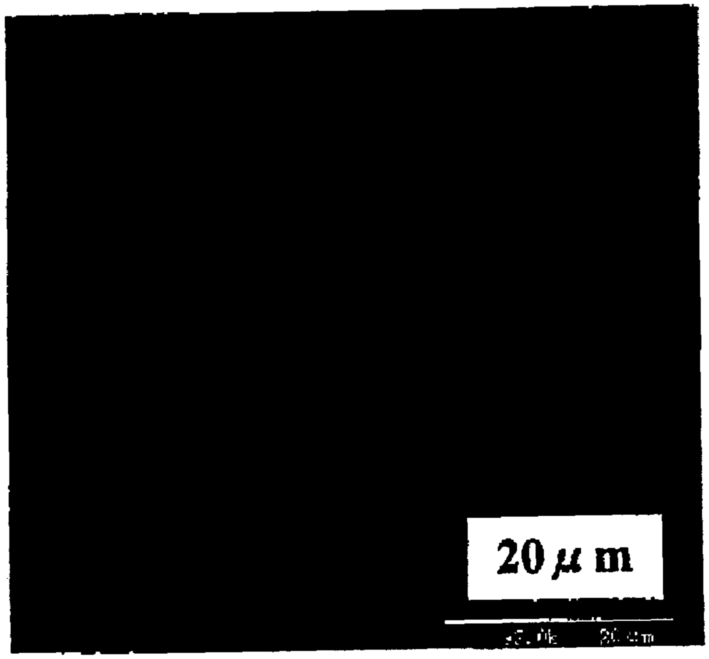
FIG. 3 shows SEM photographs of an embodiment of substrate, (a) Surface and (b) Cross Section.
Figure 3:
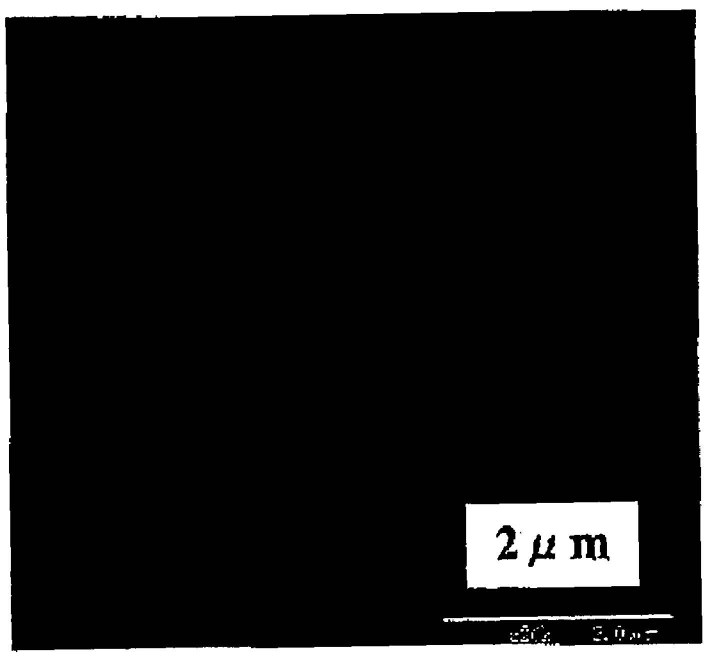
Figure 4:
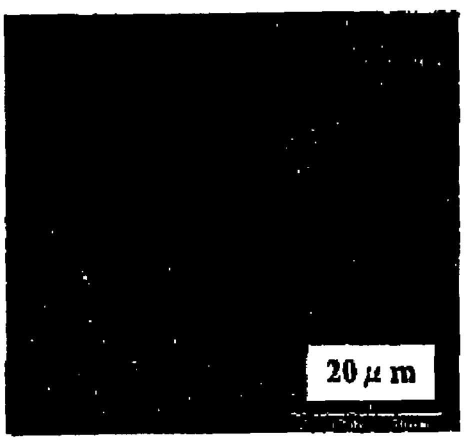
FIG. 4 shows SEM photographs of an embodiment of separation film, laminated 3 times, (a) Surface and (b) Cross Section.
Figure 4:
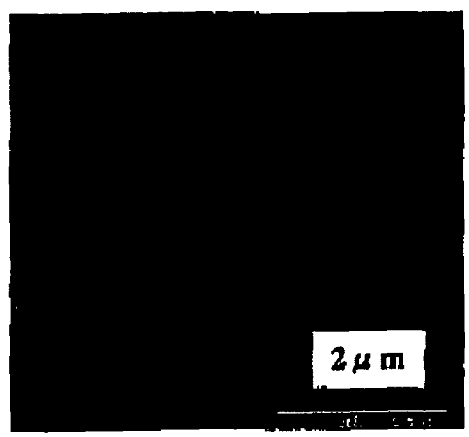
Figure 5:
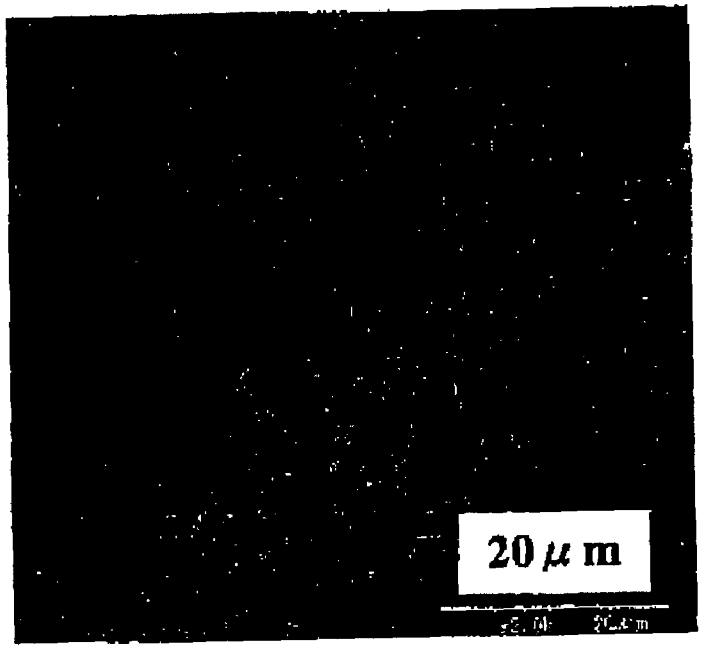
FIG. 5 shows SEM photographs of an embodiment of separation film, laminated 5 times, (a) Surface and (b) Cross Section.
Figure 5:
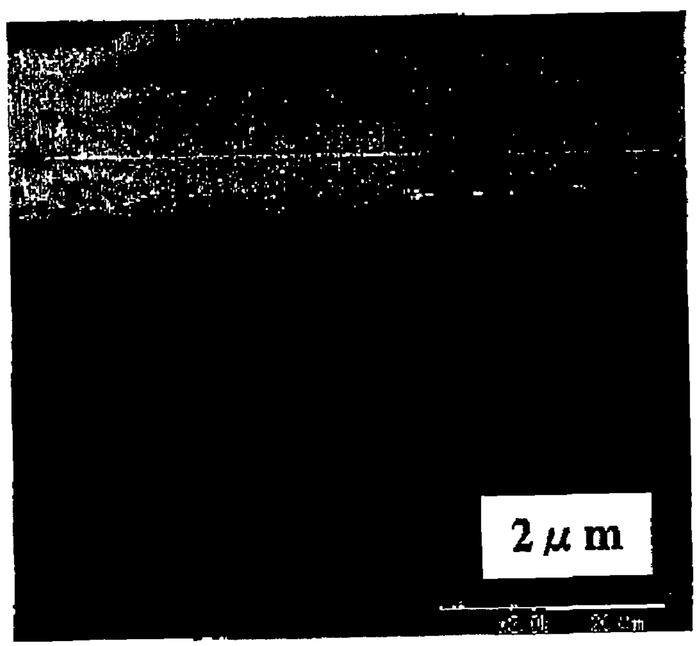
Figure 6:
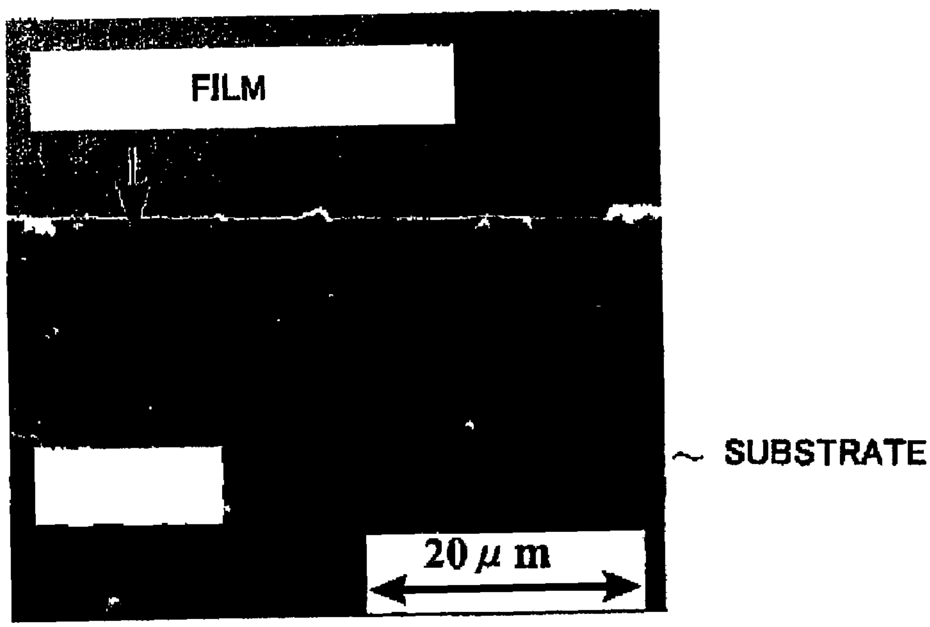
FIG. 6 shows on SEM photograph of a separation membrane laminated 7 times at cross section.
Figure 7:
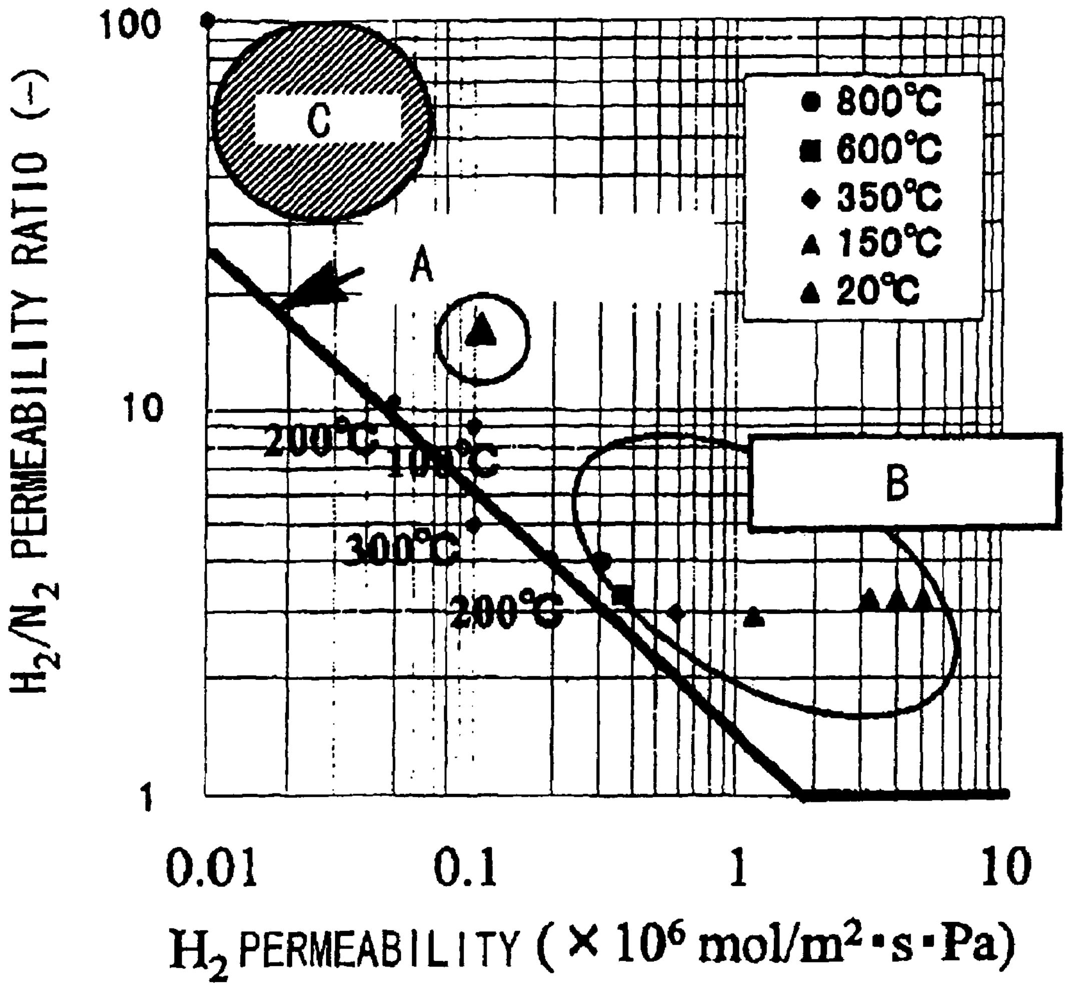
FIG. 7 is a diagram showing the performance of the separation membranes according to the present invention as contrasted to the conventional membranes.

As one working example to demonstrate the effect of the membrane structures formed under various process conditions according to the present invention, FIGS. 1 and 2 show the results (corresponding to No. 13 in Table-5) of pure gas permeation test (flow measurement: by SEF-300 (trade name, manufactured by STEC; $N_2$ gas calibration) characterizing gas permeation characteristics at ordinary temperatures of various pure gases (dependency of permeability on differential pressure) and dependency of permeability on molecular weight (of object gas to be separated).

TABLE 5

| | | | No. of | | $H_2$ | | $N_2$ | | $H_2/N_2$ |
|---|---|---|---|---|---|---|---|---|---|
| No. | I. S.[1)] | S. S.[2)] | coating (Separation layer) | Film area $mm^2$ | Differential Pr. ($kgf/cm^2$) | Permeability (mol/m2.s.Pa) | Differential Pr. ($kgf/cm^2$) | Permeability (mol/m2.s.Pa) | permeability ratio (−) |
| 1 | (a) | (a) | 1 | 457 | 0.30 | 3.52 | 0.30 | 1.12 | 3.2 |
| 2 | (a) | (b) | 1 | 517 | 0.60 | 4.30 | 0.60 | 1.35 | 3.2 |
| 3 | (a) | (d) | 2 | 644 | 0.60 | 3.84 | 0.60 | 1.20 | 3.2 |
| 4 | (a) | (e) | 2 | 615 | 0.40 | 4.16 | 0.40 | 1.31 | 3.2 |
| 5 | (b) | (d) | 1 | 661 | 0.60 | 4.06 | 0.60 | 1.28 | 3.2 |
| 6 | (b) | (f) | 2 | 573 | 0.60 | 5.44 | 0.60 | 1.77 | 3.1 |
| 7 | (b) | (e) | 2 | 640 | 0.40 | 4.00 | 0.40 | 1.26 | 3.2 |
| 8 | (b) | (e) | 1 | 637 | 0.60 | 4.04 | 0.60 | 1.27 | 3.2 |
| 9 | (c) | (g) | 1 | 482 | 0.60 | 3.92 | 0.60 | 1.27 | 3.1 |
| 10 | (c) | (h) | 1 | 248 | 0.60 | 6.08 | 0.60 | 1.94 | 3.1 |
| 11 | — | (a) | 1 | 457 | 0.30 | 5.36 | 0.30 | 1.70 | 3.2 |
| 12 | — | (b) | 1 | 664 | 0.40 | 6.08 | 0.40 | 2.70 | 3.2 |
| 13 | — | (d) | 1 | 519 | 0.60 | 6.11 | 0.60 | 1.94 | 3.2 |
| 14 | — | (e) | 1 | 568 | 0.60 | 6.43 | 0.60 | 1.89 | 3.4 |
| 15 | — | (g) | 1 | 423 | 0.60 | 8.13 | 0.60 | 2.51 | 3.1 |
| 16 | — | (a) | 2 | 547 | 0.40 | 6.32 | 0.40 | 2.07 | 3.2 |
| 17 | — | (a) | 1 | 5,650 | 0.80 | 7.53 | 0.80 | 2.89 | 2.8 |
| 18 | — | (a) | 2 | 5,270 | 0.80 | 7.57 | 0.60 | 2.51 | 2.9 |

1) "I. S." means an immersing solution for preparing as interlayer.
2) "S. S." means an immersing solution for preparing a separation layer.

Permeability $Q_1$ is calculated from the formula: $Q_1=A/[(Pr-Pp)\cdot S\cdot t]$; and permeation coefficient ratio α *, the formula; $\alpha^*=Q_2/Q_1$. Here, $Q_1$ represents gas permeability ($mol/ml^3\cdot s\cdot Pa$); α*, permeation coefficient ratio; A, permeation amount (mol); Pr, input side pressure(Pa); Pp, output side pressure(Pa); S, sectional area ($m^2$); and t, time (second) (Number of gas kinds: i=1, 2).

The results show that in case of membrane-forming various inter- and separation layers under conditions that weight ratio of polysilazane to silicon nitride and solid content were fixed, there was no remarkable effect on the gas permeation efficiency due to materials of inter- and separation layers, concentration of raw solution, and number of separation layer coatings. Namely, it was ascertained that the properties of the membranes prepared by the above process These results show that all the conditions of the present method for preparing separation membrane and inter layer are approximately within the range of preferable process conditions. Judging from the results of permeation of various pure gases (He, $H_2$, $O_2$, $N_2$, $CO_2$, $CH_4$, $C_2H_6$, $C_3H_8$, n-$C_4H_{10}$, i-$C_4H_{10}$), it was ascertained that the membrane structure of the invention shows almost stable Knudsen separation property and very high permeability as compared with that of usual inorganic films. It can be expected thereby that almost all pore sizes of the present membranes are distributed in Knudsen diffusion region (10 nm or less). It was ascertained by actually measuring mean pore size applying a nitrogen adsorption method after removing (shaving) a separation layer portion off from the present membrane in which mean pore sizes show a peak at 3 to 5 nm, Also, it was ascertained that the thickness of the separation membrane portion is about 5 μm. The term "separation layer" disclosed herein sometime means the total of these. Contradictorily, as for permeation of organic gas, permeation is slightly disturbed for some reason or other, but this does not cause any special problem in separation of inorganic gas at high temperatures such as separation of $H_2/CO$, $H_2/CH_4$ and the like for IGCC, MCFC power generation plant, $H_2$ manufacture plant.

According to the present invention, by the application of a ceramic precursor undergoing thermal decomposition in an inert atmosphere, a sintered membrane having extremely minute pores controlled is formed on the surface of a porous substrate or on the surface of an interlayer wherein each of these substrate and interlayer has small mean pore size and narrow pore size distribution. Thereby, the main material of the substrate is adjusted to that of a separation membrane portion. Particularly in the course of preparing the separation membrane by dipping, wettability of a raw solution is poor so that permeation into the substrate occurring in the course of forming can be restrained. Further, the destruction of minute structures caused under the influence of gas generation resulting from the thermal decomposition of the ceramic precursor in an inert atmosphere, shrinkage appearing in the course of sintering and others can be restrained without strictly setting the film-forming conditions. Thereby, thin membranes of defects- free having minute pores can be formed even without forming an interlayer.

In addition to the above experiments, the effect of the structure in regard of the substrate and separation layer was examined by gas permeation tests at ordinary temperatures. As a result, thin, homogeneous, and at the same time dense, porous separation membrane, in which generation of defects is restrained, was obtained by coating a ceramic precursor to form thinly a separation film portion on the surface of a porous silicon nitride substrate.

Example 2

Without the interlayer, a series of examples have been prepared. The substrates prepared by the CIP molding according to the invention have a sharp distribution spectra of the micropore size. Thus it is of interest to apply the separation membrane directly on the surface of the substrate.

An inorganic polysilazane solution of a low concentration (solid contents of 10 wt % of Tonen Polysilazane+xylene) was prepared (Immersing Solution for Separation film S.S.-1). The porous substrate of silicon nitride was dipped in this solution, and then dried in a nitrogen atmosphere, followed by calcination at 800° C. in the nitrogen atmosphere. The same step was repeated up to 7th time, thereby obtaining a separation membrane of a laminated structure on the surface of the substrate. The permeation mechanism was checked by measuring the gas permeability and SEM observation. With varied lamination times, the separation membranes were prepared, too and tested likewise. The limination times of 8 (800° C. fired) and 7 times (800° C. fired, except at 5th layer at 700° C.) were tested.

As a control, a separation membrane was prepared on the interlayer formed as in Example 1, through lamination of separation layers in 7 times.

The formulation of the solution for the interlayer (I.S.-1) is shown in Table 6. The film forming conditions for the separation membranes (Nos.-1,2) are shown in Table 7, while the test results are shown in Table 8. The results of SEM observation are shown in FIGS. 3–6.

Accordingly, a porous ceramic laminate of the present invention is: easy to enlarge the area thereof and at the same time stable in a synthetic process employed in the step of the preparation thereof; possesses a structure hard to cause thermal separation because the main materials of substrate and separation membrane or interlayer portion included in the laminate are common with each other: thereby, suitable for separation and refining processes applied at high temperatures in which heat resistance and thermal shock resistance are required; and at the same time, can be expected to exhibit ideal properties for separation membranes practically usable at high temperatures.

The meritorious effects of the present invention are summarized as follows.

A porous ceramic laminate of the present invention is suitable for a filter such as micro-filtration filter, ultrafiltration filter, gas separation filter and the like particularly for separating and refining various gases and vapors, because it includes a porous ceramic separation membrane and a substrate supporting the separation membrane, the separation membrane as well as the substrate contains non-oxide ceramic as a main component, and the separation membrane has minute pores of sizes capable of realizing Knudsen separation.

By a process for preparing a porous ceramic laminate according to the present invention, the porous ceramic laminate of the present invention, can be easily prepared, because the process includes a step of forming a porous ceramic separation membrane wherein a porous ceramic substrate is firing (calcined) on which a formed layer containing a ceramic precursor capable of producing non-oxide ceramics by calcination is supported and which contains non-oxide ceramic as a main component, and in the above separation membrane forming step, calcination is done at temperatures of producing a porous ceramic separation membrane having principally minute pores of sizes capable of realizing Knudsen separation.

It is further possible and advantage of the present invention, to provide a porous ceramic laminate having a separation membrane with pores having the sizes, even at the smallest, capable of molecular sieve separation, typically of sub-nanometer, e.g., about 5 angstroms.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

TABLE 6

Slurry for interlayer

| No. | I.S.-1 |
|---|---|
| Ube · SiN SN-E10 (wt. %) | 100 |
| Tonen inorganic polysilazane (wt. %) | 237 |
| xylene (wt. %) | 2596 |
| solid contents (wt. %) | 5.3 |

TABLE 7

| Film formation of separation film | | |
|---|---|---|
| No. | 1 | 2 |
| interlayer (Table 6) | — | I.S.-1 |
| separation layer | S.S.-1(multiple) | S.S.-1(multiple) |

TABLE 8

| film formation (times) | inter-layer | H2 Permeability (mol/m2 · s · Pa) | N2 Permeability (mol/m2 · s · Pa) | H2/N2 Permeability ratio (–) |
|---|---|---|---|---|
| 1 | none | 3.88 | 1.37 | 2.8 |
| 3 | none | 2.35 | 0.81 | 2.9 |
| 5 | none | 1.82 | 0.45 | 4.0 |
| 7 | none | 0.13 | 0.02 | 7 |
| 7 | yes | 0.18 | 0.02 | 8 |

What is claimed is:

1. A porous ceramic laminate comprising a porous ceramic separation membrane portion and a porous ceramic substrate supporting said separation membrane portion, said separation membrane portion and said substrate each comprising ceramics of Si and N, or Si and C as a main component, and said separation membrane portion comprising a plurality of pores, said pores having a pore size of 10 nm or less, wherein at least 70% of said pores have a pore size of 2 to 5 nm, which is small enough to obtain separation values equal to or greater than Kundsen separation.

2. The laminate as defined in claim 1, wherein said substrate supports said separation membrane portion through an intermediary of at least one porous ceramic interlayer.

3. The laminate as defined in claim 1, wherein said separation membrane portion comprises one or more separation membrane layers comprising an uppermost oxide or amorphous layer, and wherein said separation membrane portion has pores being of sizes small enough to obtain separation values equal to or greater than the Knudsen separation.

4. The laminate as defined in claim 2, wherein said separation membrane portion comprises one or more separation membrane layers comprising an uppermost oxide or amorphous layer, and wherein said separation membrane portion has pores being of sizes small enough to obtain separation values equal to or greater than the Knudsen separation.

5. The laminate as defined in claim 1, wherein said pores have pore sizes of less than about 10 nm, in an amount of at least 70% of the entire pores.

6. The laminate as defined in claim 2, wherein said pores have pore sizes of less than about 10 nm, in an amount of at least 70% of the entire pores.

7. The laminate as defined in claim 1, wherein said pores having pore sizes of less than about 10 nm, in an amount of at least 90% of the entire pores.

8. The laminate as defined in claim 2, wherein said pores having pore sizes of less than about 10 nm, in an amount of at least 90% of the entire pores.

9. The laminate as defined in claim 1, wherein said pores have pore sizes approximately of 2 to 5 nm in an amount of at least 80% of the entire pores.

10. The laminate as defined in claim 2, wherein said pores have pore sizes approximately of 2 to 5 nm in an amount of at least 80% of the entire pores.

11. The laminate as defined in claim 1, wherein said pores have pore sizes approximately of 2 to 5 nm in an amount of at least 95% of the entire pores.

12. The laminate as defined in claim 2, wherein said pores have pore sizes approximately of 2 to 5 nm in an amount of at least 95% of the entire pores.

13. The laminate as defined in claim 2, wherein said interlayer has a main component that is the same as that of the separation membrane portion and the substrate.

14. The laminate as defined in claim 1, wherein said separation membrane portion is essentially defect free.

15. The laminate as defined in claim 2, wherein said separation membrane portion is essentially defect free.

16. The laminate as defined in claim 1, wherein said separation membrane portion has a thickness of 20 μm or less.

17. The laminate as defined in claim 2, wherein said separation membrane portion has a thickness of 20 μm or less.

18. The laminate as defined in claim 2, wherein said interlayer has a thickness of 50 μm or less.

19. A porous ceramic filter comprising the laminate as defined in claim 1.

20. A porous ceramic filter comprising the laminate as defined in claim 2.

21. The laminate as defined in claim 1, wherein said pores have pore sizes of less than about 10 nm in an amount of at least 95% of the entire pores.

22. The laminate as defined in claim 2, wherein said pores have pore sizes of less than about 10 nm in an amount of at least 95% of the entire pores.

23. The laminate as defined in claim 1, wherein said separation membrane has a thickness of 5 μm or less.

24. The laminate as defined in claim 1, wherein said separation membrane has a thickness of 3 μm or less.

25. The laminate as defined in claim 2, wherein said separation membrane has a thickness of 5 μm or less.

26. The laminate as defined in claim 2, wherein said separation membrane has a thickness of 3 μm or less.

27. The laminate as defined in claim 2, wherein said interlayer has a thickness of 20 μm or less.

28. The laminate as defined in claim 2, wherein said interlayer has a thickness of 5 μm or less.

29. The laminate as defined in claim 1, wherein said pores have pore sizes of 2–10 nm in an amount of at least 95% of the entire pores.

30. The laminate as defined in claim 2, wherein said pores have pore sizes of 2–10 nm in an amount of at least 95% of the entire pores.

31. The laminate as defined in claim 1, wherein said pores have pore sizes of less than about 50 nm in amount of at least 70% of the entire pores.

32. The laminate as defined in claim 2, wherein said pores have pore sizes of less than about 50 nm in an amount of at least 70% of the entire pores.

33. The laminate as defined in claim 1, wherein said pores have pore sizes of less than about 50 nm in an amount of at least 90% of the entire pores.

34. The laminate as defined in claim 2, wherein said pores have pore size of less than about 50 nm in an amount of at least 90% of the entire pores.

35. The laminate as defined in claim 1, wherein said pores have pore sizes of less than about 50 nm in an amount of at least 95% of the entire pores.

36. The laminate as defined in claim 2, wherein said pores have pore sizes of less than about 50 nm in an amount of at least 95% of the entire pores.

37. The laminate as defined in claim 3, wherein each of said one or more separation membrane layers comprises an oxide layer, an amorphous layer or a layer of an intermediate state thereof.

38. The laminate as defined in claim 4, wherein each of said one or more separation membrane layers comprises an oxide layer, an amorphous layer or a layer of an intermediate state thereof.

39. The laminate as defined in claim 1, wherein said porous ceramic laminate is thermally stable to a temperature of at least 700° C.

* * * * *